(12) United States Patent
Bonomi et al.

(10) Patent No.: US 8,941,255 B2
(45) Date of Patent: Jan. 27, 2015

(54) FREE FLOATING MULTIPLE STATOR ARRANGEMENT GENERATOR FOR DIRECT DRIVE WIND TURBINE AND METHODS

(75) Inventors: Giovanni Bonomi, Medinah, IL (US); Lodovico Oldani, Rockford, IL (US); Marco Venturini, Genoa (IT); Davide Tenti, Genoa (IT)

(73) Assignee: D-Cube Wind Technologies, LLC, Rockford, IL (US)

( * ) Notice: Subject to any disclaimer, the term of this patent is extended or adjusted under 35 U.S.C. 154(b) by 60 days.

(21) Appl. No.: 13/592,610

(22) Filed: Aug. 23, 2012

(65) Prior Publication Data

US 2013/0062884 A1    Mar. 14, 2013

Related U.S. Application Data

(60) Provisional application No. 61/527,650, filed on Aug. 26, 2011, provisional application No. 61/568,537, filed on Dec. 8, 2011, provisional application No. 61/590,216, filed on Jan. 24, 2012.

(51) Int. Cl.
| | | |
|---|---|---|
| *F03D 9/00* | (2006.01) | |
| *H02P 9/04* | (2006.01) | |
| *F03D 11/00* | (2006.01) | |
| *H02K 7/18* | (2006.01) | |
| *H02K 5/26* | (2006.01) | |

(52) U.S. Cl.
CPC ............ *F03D 9/002* (2013.01); *F03D 11/0008* (2013.01); *F03D 11/005* (2013.01); *H02K 7/1838* (2013.01); *H02K 5/26* (2013.01); *H02K 2201/03* (2013.01); *H02K 2213/09* (2013.01); *Y02E 10/722* (2013.01); *Y02E 10/725* (2013.01)
USPC .......................................................... 290/55

(58) Field of Classification Search
CPC ..... F03D 9/002; F03D 11/005; F03D 11/0008; F03D 9/00; H02K 5/26; H02K 2213/09; H02K 7/1838; H02K 2201/03; H02K 21/12; Y02E 10/72; Y02E 10/7225
USPC ...................... 290/55, 54, 44, 43; 310/156.01
See application file for complete search history.

(56) References Cited

U.S. PATENT DOCUMENTS

| | | | |
|---|---|---|---|
| 6,891,302 B1 | 5/2005 | Gabrys | |
| 7,154,191 B2 | 12/2006 | Jansen et al. | |
| 7,830,063 B2 | 11/2010 | Jansen et al. | |
| 8,536,751 B2 * | 9/2013 | Cipriani | ........................ 310/191 |
| 2011/0025066 A1 | 2/2011 | Cipriani | |

FOREIGN PATENT DOCUMENTS

| | | | |
|---|---|---|---|
| EP | 1 988 286 | * | 5/2008 |
| IT | MI920815 A1 | | 10/1993 |
| JP | 3740111 | | 2/2006 |

* cited by examiner

*Primary Examiner* — Javaid Nasri
(74) *Attorney, Agent, or Firm* — Reinhart Boerner Van Deuren P.C.

(57) ABSTRACT

A generator for a wind turbine is provided. The generator includes a housing with a multi-piece stator arrangement mounted to the housing, the stator arrangement surrounding radially inward and radially outwardly directed faces of a rotor assembly, also surrounded by the housing. The rotor assembly is configured for direct attachment to a wind turbine main shaft so that rotation of the main shaft results in like rotation of the rotor assembly. The housing is mechanically coupled to the rotor by anti-friction elements such that the rotor is free to rotate about its central axis relative to the housing, and such that radial displacement of the rotor due to main shaft deflections results in a like radial displacement of the housing.

24 Claims, 14 Drawing Sheets

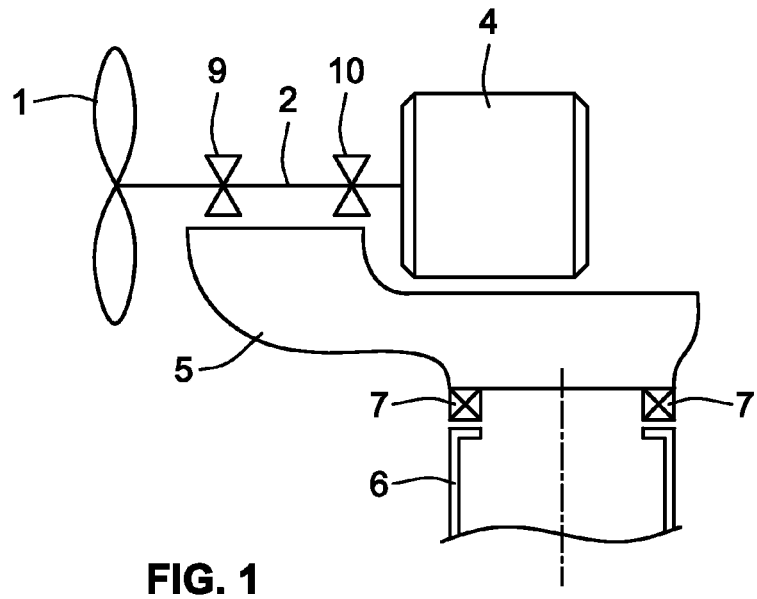
FIG. 1
PRIOR ART
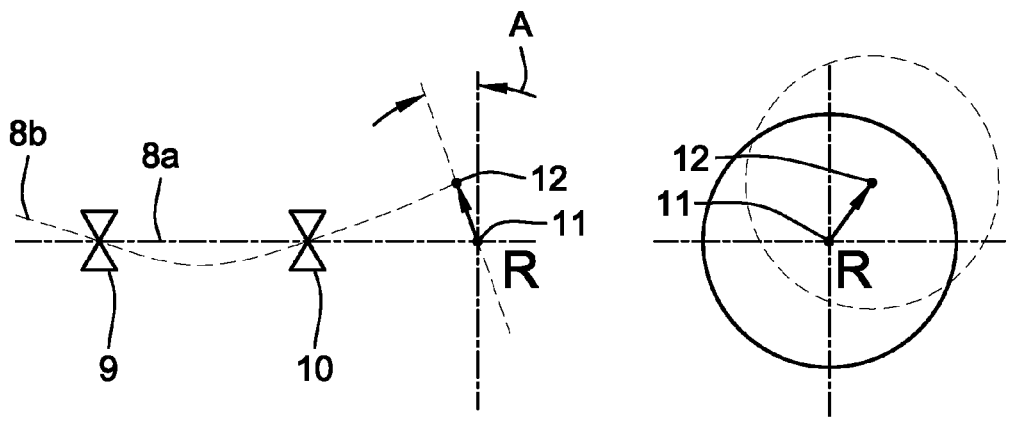
FIG. 2A
PRIOR ART
FIG. 2B
PRIOR ART

FREE FLOATING MULTIPLE STATOR ARRANGEMENT GENERATOR FOR DIRECT DRIVE WIND TURBINE AND METHODS

CROSS-REFERENCE TO RELATED PATENT APPLICATIONS

This patent application claims the benefit of U.S. Provisional Patent Application No. 61/527,650, filed Aug. 26, 2011, U.S. Provisional Patent Application No. 61/568,537, filed Dec. 8, 2011, and U.S. Provisional Patent Application No. 61/590,216, filed Jan. 24, 2012, the entire teachings and disclosure of which are incorporated herein by reference thereto.

FIELD OF THE INVENTION

This invention generally relates to wind turbines and more particularly to the generator for a direct drive wind turbine used for electric power generation.

BACKGROUND OF THE INVENTION

The wind energy field is encountering steady growth aimed to meet a worldwide increasing demand for green energy. The research and development of the new technology focused on improving the quality, cost, efficiency, and reliability of the machines for producing such green energy is consequently very active worldwide.

One of the latest trends is a so called direct drive arrangement, wherein the rotor blade directly drives the generator with no gearbox, interposed between. This direct drive arrangement is introducing a major improvement in efficiency and reliability because gearboxes are inefficient and high maintenance items, and are basically negatively affecting original equipment costs as well operating costs (maintenance costs).

In the direct drive arrangement, however, one of the most challenging goals is to set the air gap distance between rotor and stator to minimal value in order to minimize the generator cost but also make sure that the deformations under wind loads do not create the condition of contact between rotor and stator which would unavoidably create a damage to the generator assembly. Such a condition can be defined in terms of the air gap "AG" between the rotor and the stator. When AG=0, the rotor has deflected to such a degree so as to contact the stator, and thus damage or entirely destroy the generator.

It is important to observe that direct drive technology can be classified according to Electric generator type as well as Mechanical drive train arrangement type. Generator type can be synchronous generator, asynchronous or a modern permanent magnet generator (PMG), while mechanical drive train arrangement can be classified in Type 1 generator assembly directly coupled to the main shaft of the wind turbine, Type 2 generator assembly coupled to main shaft assembly by means of suitable torque couplers Type 1 arrangement foresees the generator assembly rigidly mounted to the wind turbine frame, the stator is stationary, the rotor is directly coupled to turbine main shaft end and consequently it is deforming due shaft deformation under wind loads. In this arrangement air gap between air gap generator stator motor must take into consideration the air gap contraction due to main shaft deformations induced by the wind loads.

Type 2 arrangement foresees the generator assembly rigidly mounted to the wind turbine frame. The generator has its own shaft and its own bearings and the generator shaft does not see the turbine main shaft deformations under wind load because a suitable coupling isolates the two shafts and pure torque is transmitted to the generator shaft (not undesired side loads). This type is rather rare due to the heavy cost and weight of the coupling.

As mentioned above, among the different type of electric direct drive generators, one of the most of the modern is the so called PMG (permanent magnet generator) wherein the efficiency, the size, the weight and ultimately the cost of the generator is greatly affected by the air gap value. For example, a minimum air gap of 3.0 mm on a 3 m diameter, 2 MW generator would be optimal to minimize generator electric active component mass and any additional millimeter (4.0 mm, 5.0 mm, etc.) of air gap would significantly increase dimension, weight, and cost.

On the other hand, the final generator air gap design value has to take into consideration a plurality of factors that are in reality demanding to increase said air gap design values, in particular:

Manufacturing tolerance

Shaft, bearings, and structure deformations under severe wind dynamic loads

Magnetic forces exchanged between rotor and stator

Additional temperature deformations induced from uneven temperature distribution Since the accidental contact between rotating rotor (carrying magnets) and stationary stator would lead to almost immediate generator damage, it becomes evident how important it is that the structure of the aforementioned direct drive generators will be able to contain all above mentioned deformations within a minimum value in order to minimize the air gap requirements, thus allowing the generator to be efficient from the electric standpoint.

Of course building rigid structures means heavy weights, high rigidity bearings, and ultimately, higher costs. It is consequently evident that the air gap value must be set to a compromised value which minimizes the overall cost of the generator electric active components and mechanical structure all together (increasing air gap reduces structural costs but increases generator costs and vice versa).

All above factors contributing to the need to increase said generator air gap are in direct contrast to the need of minimizing it in order to achieve minimum generator cost and maximum efficiency. An example will help to explain Mechanical manufacturing tolerance $AG1=2.0$ mm Wind deflection $AG2=2.0$ mm Electro-magnetic forces $AG3=1.0$ mm Temperature induced deformations $AG4=1.5$ mm Total air gap requirement=$AG1+AG2+AG3=6.5$ mm Optimal air gap distance to achieve the lowest cost/best performance electric generator=$AG0=2.5$ mm Additional costs of the generator to provide the same power operating with $AG=6.5$ mm versus $AG=2.5$ mm is estimated to be at least 20%, with the additional disadvantage of the efficiency dropping at least two points.

Consequently it appears clear, how an air gap higher than optimum value affects the costs of the electric active masses inside the generator of the wind turbine. On the other hand, tightening the air gap down to generator optimal value (2.5 mm) while maintaining safe operations for 25 years life under any load condition without ever reaching the dangerous condition $AG=0$ (contact between rotor and stator, and generator damage) would mean adapting very stiff, heavy and expensive mechanical structures, which would be far more expensive than the extra generator cost and efficiency drop mentioned above.

This is basically the reason why most of the known PPM direct drive generators for wind turbines (almost entirely coupled to turbine main shaft according to type 1 arrangement mentioned above) are operating within 'compromised' air gap values between 5 and 8 mm, which is rather distant from optimum electric generator cost and performances.

Recently, the higher cost of the generator due to increased air gap operating conditions is further aggravated from the higher cost of magnets (rare earth magnets, such as neodymium) which recently have procurement costs far higher than in the past. A generator operating with higher than optimal air gap would need higher neodymium magnets in high quantity to produce the same power (to compensate drop of efficiency due to increased air gap).

Accordingly, there is a need in the art for a wind turbine having a generator that provides a high output solution at a relatively low cost by virtue of a reduced air gap. Embodiments of the invention provide such a generator.

The invention provides such a wind turbine and associated generator. These and other advantages of the invention, as well as additional inventive features, will be apparent from the description of the invention provided herein.

SUMMARY OF THE INVENTION

According to aspects of the invention, a "Type 3" arrangement is provided which foresees the generator assembly rigidly mounted to the turbine main shaft rear end but free to float in space. In this case the generator has its own bearings and is not trying to constrain side deformation of the main shaft, but it is rather following without offering any substantial radial reaction, the shaft deformations. In this arrangement, the air gap between the generator stator and generator rotor is substantially unaffected from turbine main shaft deformation due to wind loads. As better explained here below, the generator assembly according to present invention is a PMG electric generator connected to wind turbine according to Type 3 arrangement described above, more precisely, it is intended to be directly mounted to the turbine main shaft but it is free to follow the shaft deformation in space with an air gap between rotor and stator and maintained "undisturbed" from wind loads.

The generator assembly according to the present invention is a PMG type generator and Type 3 drive train arrangement and is conceived to pursue the following goals:

Minimum air gap between rotor and stator, mechanically undisturbed by turbine main shaft deformation induced by heavy wind loads;

Safe and positive air gap control;

Superior mechanical structure rigidity with minimal costs;

Very compact assembly with minimum dimension and weights;

Minimum overall costs of electric generator plus mechanical structure for assigned generator power rating;

Record generator efficiency;

Superior built in cooling system capable to properly maintain a cool generator stator as well as the generator rotor under any power generating condition, even in hot weather conditions;

Built-in cooling system capable to maintain constant temperature of all parts inside the generator (temperature uniformity) under any power generating condition.

Wind deflections are not constrained, leaving the generator assembly free to float with said shaft deformation and consequently remove the need to increase air gap between rotor and stator in order to accommodate (cope with said wind load induced shaft deformation);

Quadruple stator ring arrangement provides unmatched generator compactness;

Fly wheel shape rotor arrangement allows balancing of the dynamic magnetic forces exchanged between rotor and stator;

Generator mechanical structure very rigid, very light, minimum cost; and

Unmatched ratio power/generator weight.

In one aspect, embodiments of the present invention achieve the aforementioned goals by providing a generator for a wind turbine. An embodiment of a generator according to this aspect includes a housing defining a center axis. A stator arrangement is mounted to interior surfaces of the housing and centered about the center axis. A rotor assembly is configured for direct attachment to a wind turbine main shaft such that rotation of the wind turbine main shaft results in a like rotation of the rotor assembly. The rotor assembly has radially inward and radially outward directed faces. The radially inward and radially outward directed faces each face a portion of the stator arrangement. The housing is mechanically coupled to the rotor assembly such that the rotor assembly is free to rotate relative to the housing and such that displacement of the rotor assembly from the center axis of the housing result in a like displacement of the stator arrangement.

In certain embodiments, the housing is a multi-piece housing including at least two shell halves which mate about a plane perpendicular to the center axis. Each shell half may include an outer ring and a core. The outer ring is attached to the core to define a cavity within the housing having a generally T-shaped cross-section on one side of the center axis of the housing.

In certain embodiments, the stator arrangement is a multi-piece stator arrangement including at least three concentric rings. The at least three concentric rings may include a first, a second, and a third stator ring. The first and second stator rings are radially inward of the radially inward directed face of the rotor assembly. The third stator ring is radially outward of the radially outward directed face of the radially outward directed face of the rotor assembly.

In certain embodiments, the at least three concentric rings may include a first, a second, a third, and a fourth stator ring. The first and second stator rings radially inward of the radially inward directed face of the rotor assembly. The third and fourth stator rings are radially outward of the radially outward directed face of the rotor assembly.

In certain embodiments, each one of the at least three concentric rings comprises a plurality of independent arguate stator segments. Each stator segment includes a cooling means for directing coolant through the stator segment.

In certain embodiments, the rotor assembly may include a rotor structure having a generally T-shaped cross-section on one side of the center axis, with a plurality of ring-shaped magnet structures attached to the rotor structure. The plurality of ring-shaped magnet structures includes a first, a second, a third, and a fourth magnetic ring structure. The first and second magnetic ring structures are mounted to the radially inward directed faces of the rotor assembly. The third and fourth magnetic ring structures are mounted to the radially outward directed faces of the rotor assembly. The first, second, third, and fourth magnetic ring structures are each concentrically arranged about the center axis of the housing. The first and second magnetic ring structures are radially equidistant from the center axis of the housing. The third and fourth magnetic ring structures are radially equidistant from the center axis of the housing.

In certain embodiments, the rotor assembly comprises a rotor structure having a plurality of regularly-spaced, radially outwardly directed grooves. The rotor assembly also includes a plurality of bar-shaped magnetic structures. Each one of the plurality of bar-shaped magnet structures respectively mounted in each one of the radially outwardly directed grooves. The plurality of bar-shaped magnet structures are arranged parallel to one another, and parallel to a center axis of the housing. Each one of the plurality of bar-shaped magnet structures includes a core having a first and a second end. A first magnet assembly is mounted adjacent the first end of the core. A second magnet assembly is mounted adjacent a second end of the core.

In another aspect, embodiments of the present invention achieve the aforementioned goals by providing a generator for a wind turbine. An embodiment of a generator according to this aspect includes a housing defining a center axis and having a cavity. A stator arrangement is mounted to the housing within the cavity and concentrically arranged about the center axis of the housing. A rotor assembly is concentrically arranged about the axis. The rotor assembly includes a rotor frame structure with a plurality of magnet structures arranged on an outer periphery of the rotor frame structure parallel to one another. Each one of the plurality of magnet structures has a radially inwardly and a radially outwardly directed face. Each of the radially inwardly and radially outwardly directed faces face a portion of the stator arrangement.

In certain embodiments, each one of the plurality of magnet structures is bar-shaped and may include a core extending longitudinally between first and second ends. A first magnet assembly is positioned on the core adjacent the first end. A second magnet assembly is positioned on the core adjacent the second end. The first and second magnet assemblies are axially spaced apart from one another along the core. Each of the first and second magnet assemblies includes a first and a second plurality of magnets. The first and second plurality of magnets are arranged in a radially opposed spaced relationship. A plurality of identical laminations are arranged along the core and support each of the first and second pluralities of magnets.

In certain embodiments, the first magnet assembly of each one of the plurality of bar-shaped magnet structures is radially interposed between first and second concentric stator rings of the stator arrangement. The second magnet assembly of each one of the plurality of bar-shaped magnet structures is radially interposed between third and fourth concentric stator rings of the stator arrangement.

In certain embodiments, the housing is mechanically coupled to the rotor assembly such that the rotor assembly is free to rotate relative to the housing and such that displacement of the rotor from the center axis of the housing results in a like displacement of the stator arrangement.

In yet another aspect, embodiments of the present invention achieve the aforementioned goals by providing a wind turbine. An embodiment of a wind turbine according to this aspect includes a support frame. A turbine main shaft is arranged along a center axis of the wind turbine. A generator including a stator arrangement and a rotor assembly which is directly coupled to the turbine main shaft such that rotation of the turbine main shaft results in a like rotation of the rotor assembly is also provided. The stator arrangement and rotor assembly are internally disposed within a housing of the generator. The wind turbine also includes a torque arm arrangement connected between the support frame and the housing. The torque arm arrangement is adapted to resist a rotation of the housing in response to a rotation of the rotor assembly relative to the housing. The torque arm arrangement is also adapted to allow for displacement of the generator relative to the center axis of the wind turbine.

In certain embodiments, the rotor assembly of the generator may comprise a rotor frame structure with a plurality of magnet structures arranged on an outer periphery of the rotor frame structure parallel to one another. Each one of the plurality of magnet structures has a radially inwardly and a radially outwardly directed face. Each of the radially inwardly and radially outwardly directed faces face a portion of the stator arrangement.

In certain embodiments, the housing is mechanically coupled to the rotor assembly such that the rotor assembly is free to rotate relative to the housing and such that displacement of the rotor from the center axis results in a like displacement of the stator arrangement.

In certain embodiments, the stator arrangement is disposed radially interior and radially exterior of the rotor assembly.

In certain embodiments, the wind turbine further includes a coolant bath arranged within the housing such that it encompasses a portion of the rotor assembly as the rotor assembly rotates commensurate with the rotation of the turbine main shaft.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 schematically shows a typical windmill turbine arrangement;

FIGS. 2A and 2B schematically show the deflections of a turbine main shaft of the turbine arrangement of FIG. 1 under severe wind loads;

Figure 3:
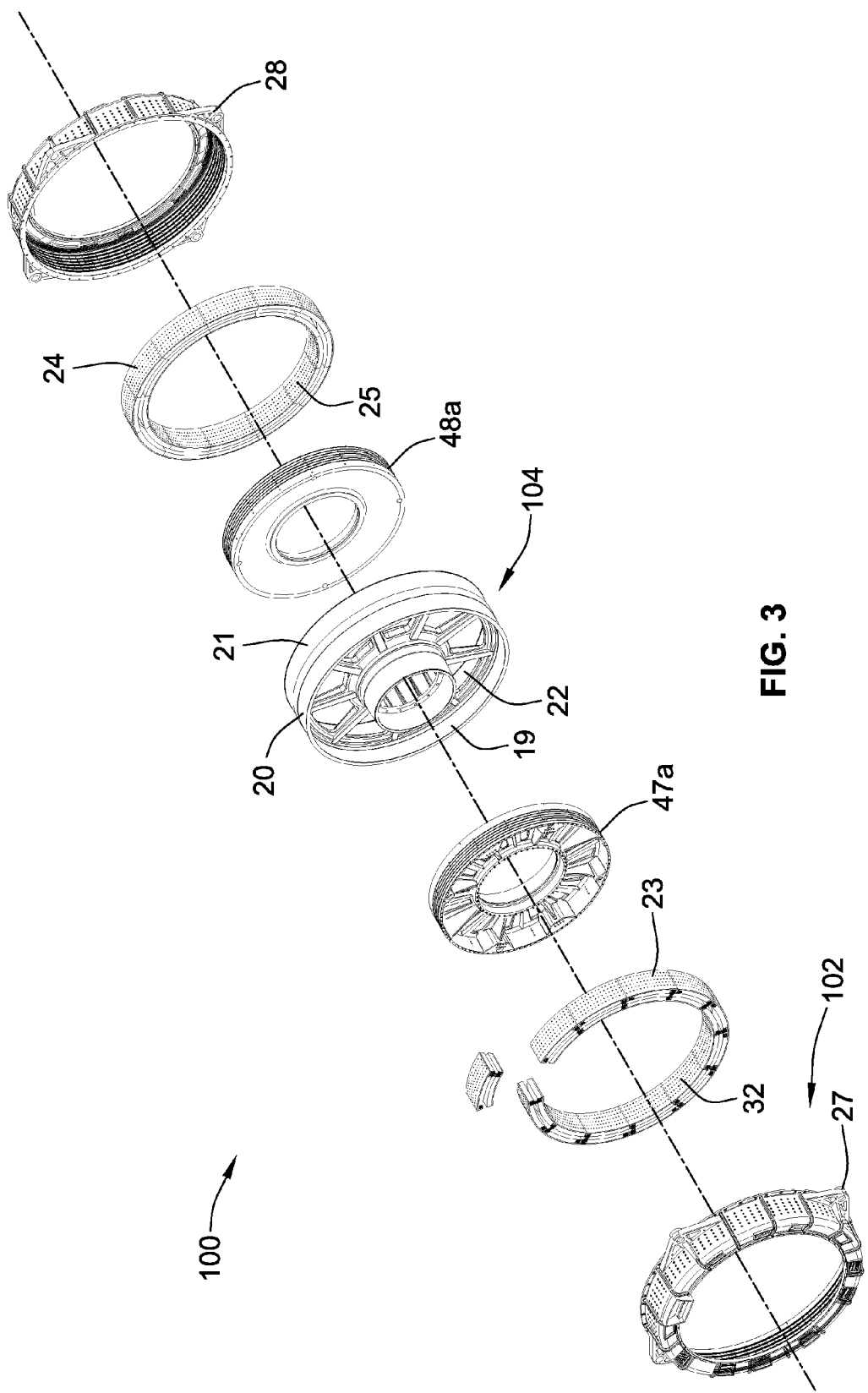
FIG. 3 is an exploded view of an exemplary embodiment of a generator according to the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIG. 1 schematically shows the main components of a conventional direct drive wind turbine comprising a rotor blade 1, a main shaft 2, supporting bearing 9 and 10, a direct driven generator assembly 4, a main frame 5, a tower section 6, and a yaw bearing 7. In a non-direct drive train configuration, it will be recognized that the generator 4 is replaced by a large gear box connected to a high speed electric generator which multiplies the rotor rpm (not shown).

FIGS. 2A and 2B schematically show the turbine main shaft 2 under wind load deformations transmitted by the rotor shaft 1. In particular it shows shaft 2 supported by front and rear bearings 9, 10 in a non-deformed position (no loads) denoted by reference 8a. FIG. 2A also shows turbine main shaft 2 in a deformed position, denoted by reference 8b which schematically shows how shaft 2 deforms under wind loads. FIG. 2B in particular illustrates how the shaft rear end point 11 moves toward point 12 under wind loading creating a radial deformation R. Said R movement of shaft end from point 11 to point 12 also implies, besides a radial deformation, a rotation A which usually generates major problems to the turbine transmission. Accordingly, it will be understood from the following how embodiments of the present invention cope with these deformations shown in FIGS. 2A-2B.

FIG. 3 is a perspective exploded view of generator 100 according to the teachings of the present invention. Generator 100 includes a multi-part outer housing 102 comprising shell halves 27, 28 and cores 47a, 48a, which house a rotor 104 that is surrounded by stator assembly 106 in the form of a plurality of segmented stator rings 32, 23, 24, and 25. In other embodiments, housing 102 may simply comprise shells 27, 28 that incorporate cores 47a, 48a, respectively so that housing 102 is overall a two part structure. A plurality of magnets 19, 20, 21, and 22 are mounted on rotor 104. Rotor 104 is fixedly connected to a wind turbine main shaft (not shown) and rotates commensurate with the rotation of the main shaft. Housing 102 maintains the stator rings 32, 23, 24, and 25 spatially relative to the rotor 104 such that the rotor 104 has stator rings proximal to its interior and exterior sides. Rotor 104 rotates in proximity to these stator rings to generate electricity. Stator rings 32, 23, 24, and 25 are in turn connected an electrical power circuit for transmission of electricity generated via the rotation of the rotor 104 relative to stator rings 32, 23, 24, and 25.

As will be explained in greater detail below, housing 102 is mounted to rotor 104 by an anti-friction rotational element, e.g. a bearing or bearings, which ensure that radial deflection of rotor 104 due to radial deflection of the turbine main shaft under wind loading will cause a like movement or radial deflection in housing 102. Given that stator rings 32, 23, 24, and 25 are fixedly mounted to the housing 102, each stator ring 32, 23, 24, and 25 will undergo a like radial deflection. As a result, a constant air gap is maintained between rotor 104 and stator rings 32, 23, 24, and 25. Because a constant air gap is maintained, the overall air gap between rotor 104 and stator rings 32, 23, 24, and 25 can be reduced or minimized when compared to prior designs.

Figure 4:
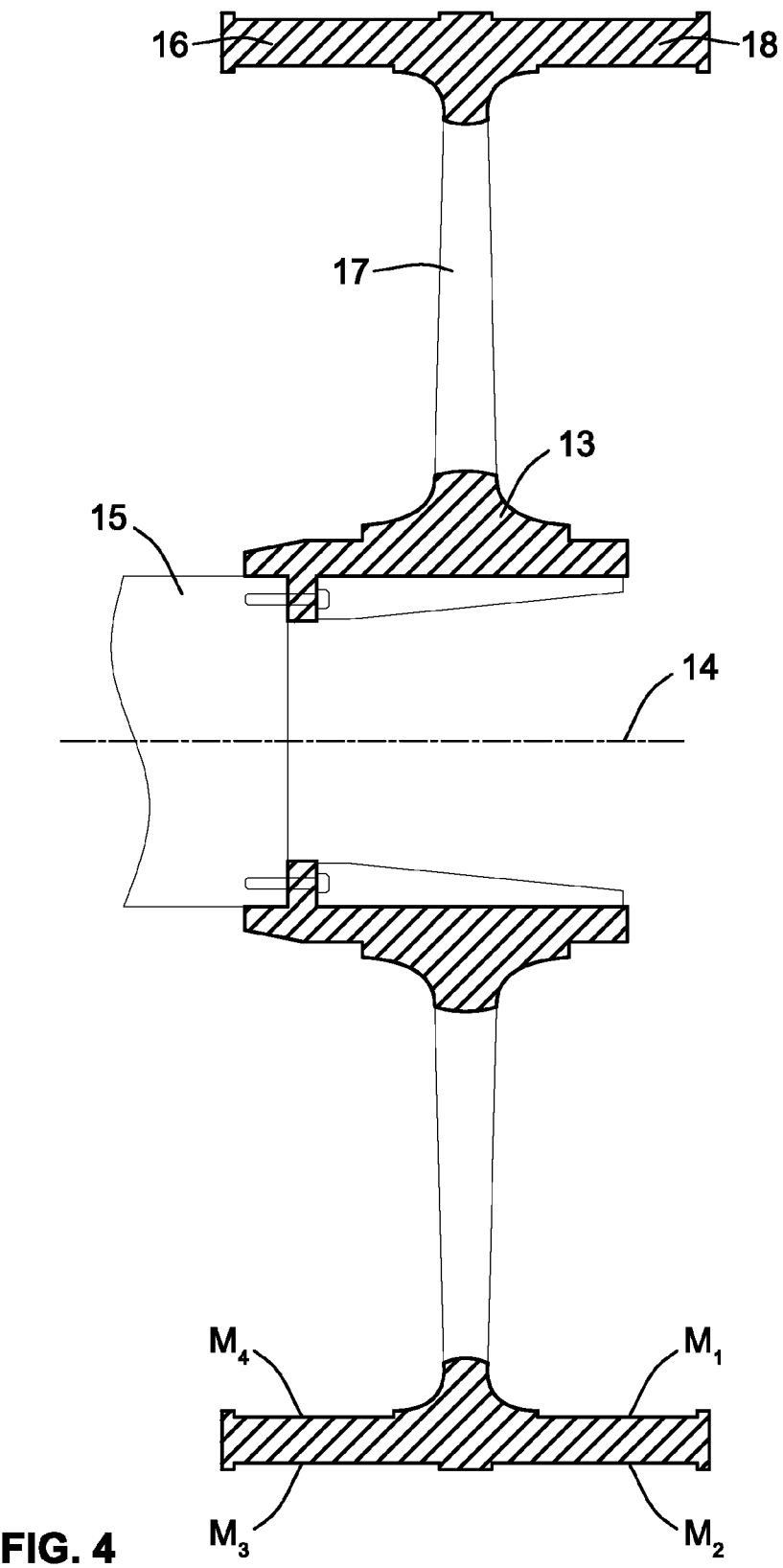
FIG. 4 is a side cross section of a fly-wheel shaped rotor structure/frame of the generator of FIG. 3.

FIG. 4 schematically shows a cross section of the rotor structure according to the present invention which comprises a hub 13 flange mounted to the rear end of the main shaft 15 and a "fly wheel" shaped rotor wheel structure featuring flat rings 16 and 18 and a plurality of spokes 17 connecting said hub 13 to said rings 16 and 18. The center line of shaft 15 is indicated with reference 14. Rings 16 and 18 are provided with cavities, M1, M2, M3, and M4 designed to house the generator rotor magnets described in FIG. 5.

Figure 5:
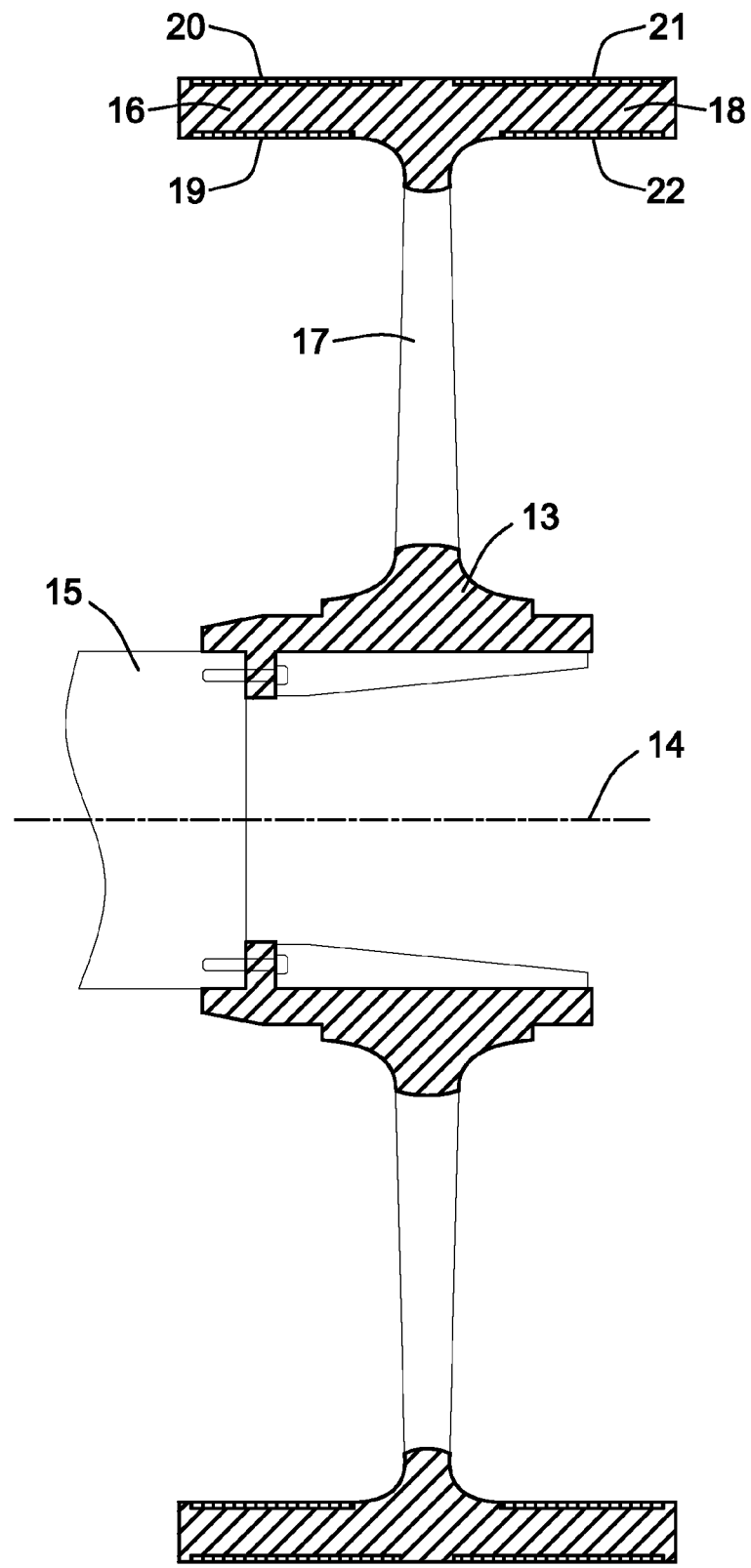
FIG. 5 is a side cross section the rotor of FIG. 4 equipped with magnets.

FIG. 5 schematically shows a cross section of how "fly wheel" shaped rotor 104 of FIG. 4 receiving permanent magnets 19, 20, 21 and 22 connected to the flat surfaces (M1-M4) of rotor rings 16 and 18 of FIG. 4.

Figure 6:
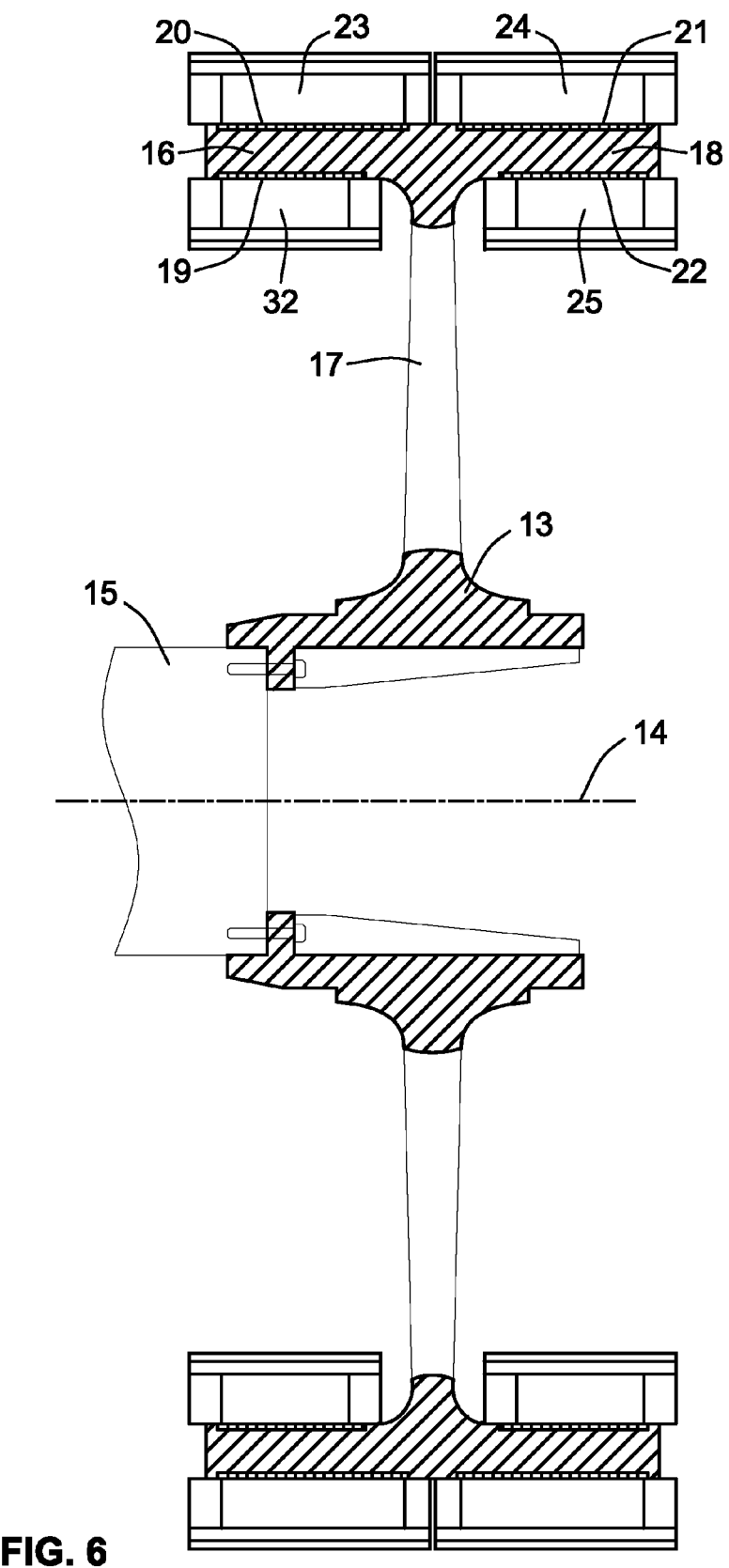
FIG. 6 is a side cross section of the rotor of FIG. 4 in proximity to stator elements of the generator of FIG. 3.

FIG. 6 schematically shows a cross section of how the generator stator rings 32, 23, 24 and 25 are positioned in space versus rotor 104, in particular how stator ring 32 faces rotor magnet 19, stator ring 23 faces rotor magnet 20, stator ring 24 faces rotor magnet 21, and stator ring 25 faces rotor magnet 22. It will be recognized by those skilled in the art that each of the aforementioned pairings interact to generate electrical current.

More specifically, magnet ring 19 is mounted on the left hand internal surface of rotor ring 16 and is cooperating with left end inner stator ring 32 while magnet ring 20 is mounted on the external surface of rotor ring 16 and is cooperating with external stator ring 23. Similarly, magnet ring 22 is mounted on the right hand internal surface of rotor ring 18 and is cooperating with right hand inner stator ring 25. In an alternative arrangement the generator may present the outer stator 23 and 24 in one single external stator ring and the corresponding magnets 20 and 21 also being one single ring (in other words, the generator will feature left hand inner stator ring, right hand inner stator ring, and one single external stator ring forming a 3 stator ring arrangement instead of a 4 stator ring arrangement). Both arrangement (3 stator ring as well as 4 stator ring) remain very compact and maintain a substantially symmetrical arrangement which is one advantage of the present invention.

Figure 7:
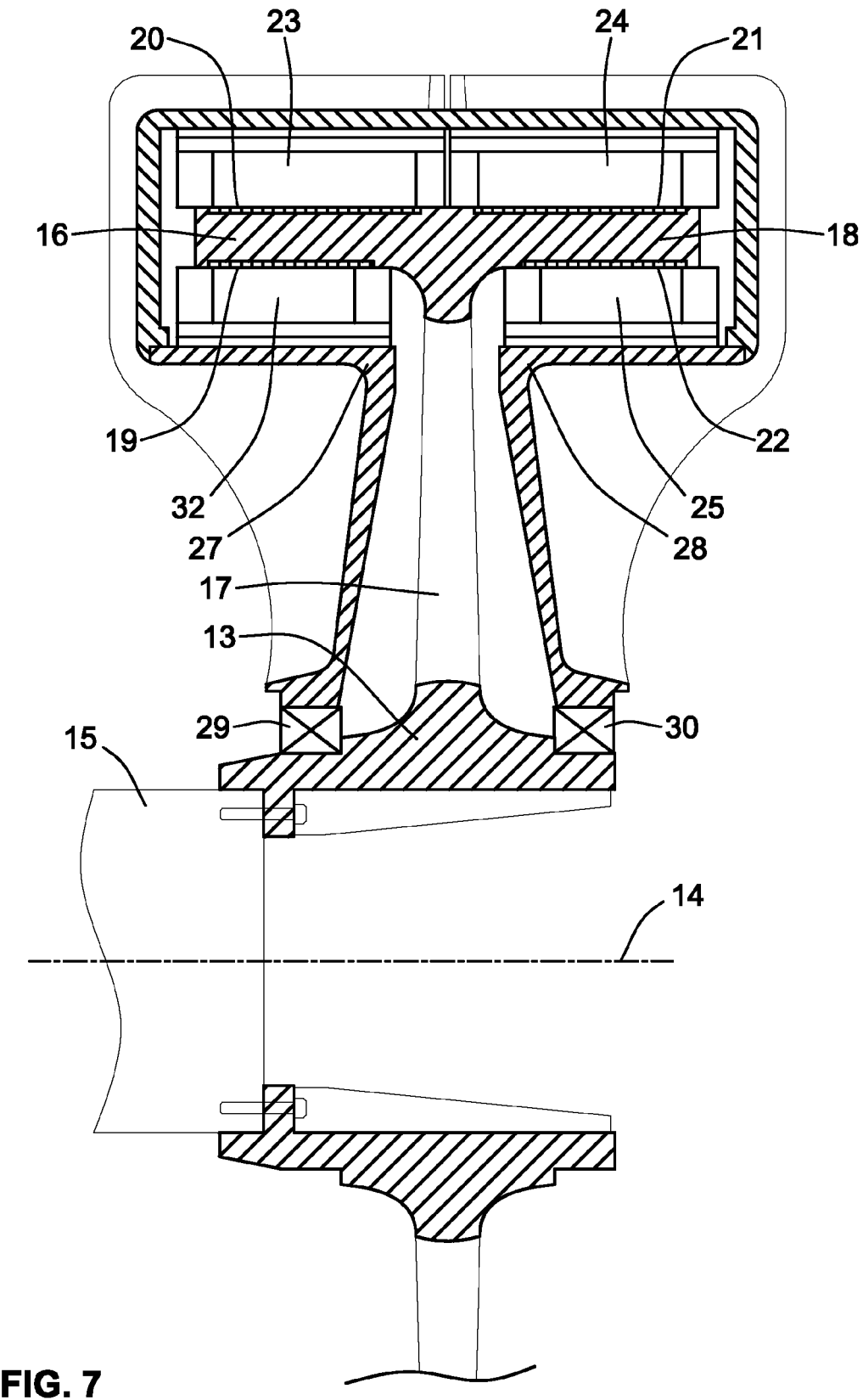
FIG. 7 is a partial side cross section of the rotor and stator elements of FIG. 6 with a stator housing illustrated holding the stator elements spatially relative to the rotor.

FIG. 7 schematically shows a cross section of the generator according to present invention in particular how the 4 stator rings 32, 23, 24 and 25 are held together by means of two shells 27 and 28 of housing 102, substantially symmetrical one to another and both respectively connected to rotor main central hub 13 of rotor 104 by means of bearings 29 and 30. The result is a fully enclosed generator assembly featuring a four separate stator ring assembly wrapped around a fly wheel shaped rotor structure with the ability to be directly flange connected to the rear end of main shaft 15 sharing shaft centerline 14. As better explained below, said unique arrangement is free to follow in space the shaft deformations R and A of FIGS. 2A-2B completely unconstrained and thus preventing the wind loads to alter the air gap between said rotor rings and said stator rings.

Figure 8:
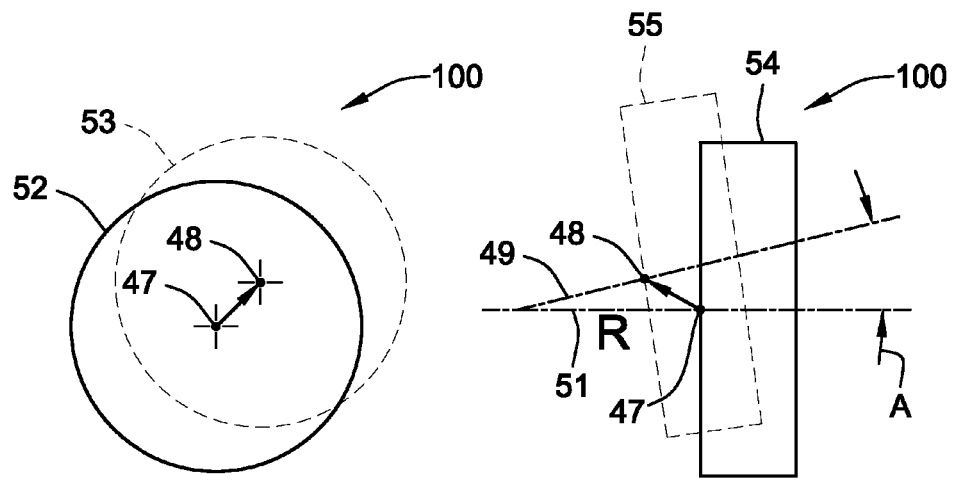
FIG. 8 schematically shows radial as well as angular movement of the generator of FIG. 3 under wind loads when mounted to a turbine main shaft.

FIG. 8 schematically shows again the deformation R and A of a wind turbine main shaft 51 under wind loads and how the entire generator assembly 100 of FIG. 3 is left to freely follow said shaft rear end deflections R and A without opposing any reaction force. In particular during radial shaft deflection R, the entire generator assembly 100 shifts position from 52 to position 53 and during rotation deflection A, the entire generator assembly 100 rotates from position 54 to position 55. FIG. 8 also shows how point 47 shifts to point 48 when shaft 51 assumes position 49 as a result of the wind loads. The forgoing functionality is achieved through the use of bearings 29, 30 which connect rotor 104 to housing 102, and particularly to shells 27 and 28. Indeed, bearings 29, 30 permit rotor 104 to freely rotate relative to shells 27, 28. However, deflections R and A of shaft 51 shown in FIG. 8 will cause a like deformation in rotor 104, as it is fixedly flange mounted to an end of this shaft. This like deformation in rotor 104 will be radially transferred to shells 27, 28, given that bearings 29, 30 radially connect these elements such that rotor 104 cannot not radially move relative to shells 27, 28 and vice versa.

Figure 9:
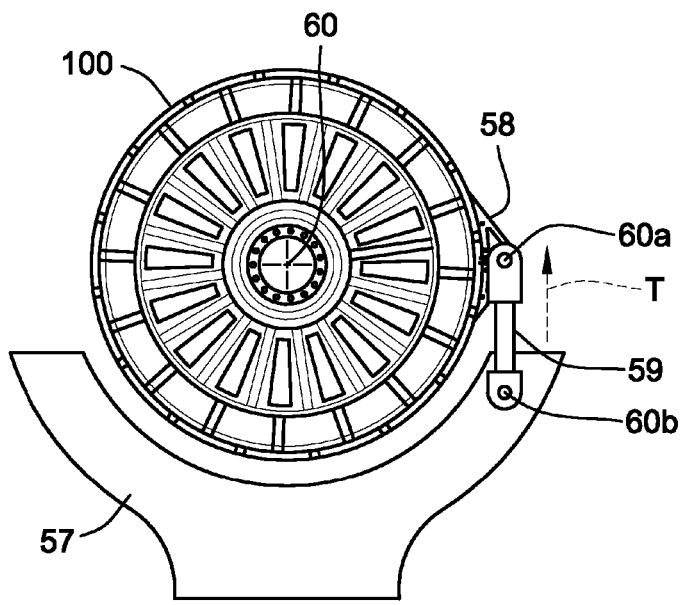
FIG. 9 is a front view of the generator of FIG. 3 connected to a turbine main frame by means of a torque arm.

FIG. 9 schematically shows a counter torque system connecting generator 100 to turbine main frame 57 by means of an arm 59 attached to a mount 58 of generator 100. The reaction force T is only preventing rotation of the generator outer shell 56 around its center line 60 without opposing any reaction to said shaft deflection R and A in FIG. 7 via mount 60b.

Figure 10:
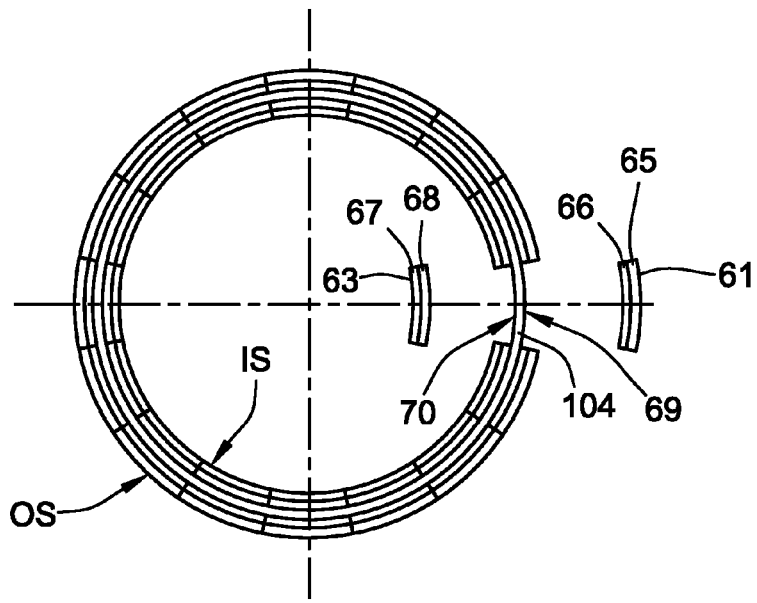
FIG. 10 is a front view of the stator and rotor of FIG. 3 illustrating the segmented construction of each stator element.

FIG. 10 shows schematically how stator rings OS (outer stator rings) and IS (inner stator rings) can be built as a plurality of segments 61, 62, 63, and 64 rather than one single ring. FIG. 10 also shows how each outer stator segment 61 is includes a stator winding 66 mounted to an outer stator segment base 65 which is basically offering a pre-mounting structure to all windings 66 in order to offer a solid state element, usually resin vacuum impregnated. Base 65 is may also comprise a built in cooling system suitable to evacuate the heat produced by the winding 66 connected thereto during operation. As illustrated, rotor 104 is interposed between the inner and outer stator rings and is carrying magnet 69 and magnet 70 respectively on its external and internal surfaces, which represent magnet rings 20, 21 and 19, 22 of FIG. 5, respectively. Each stator segment of each stator ring 32, 23, 2, 25 is interchangeable providing for a significant reduction in cost of maintenance.

Figure 11:
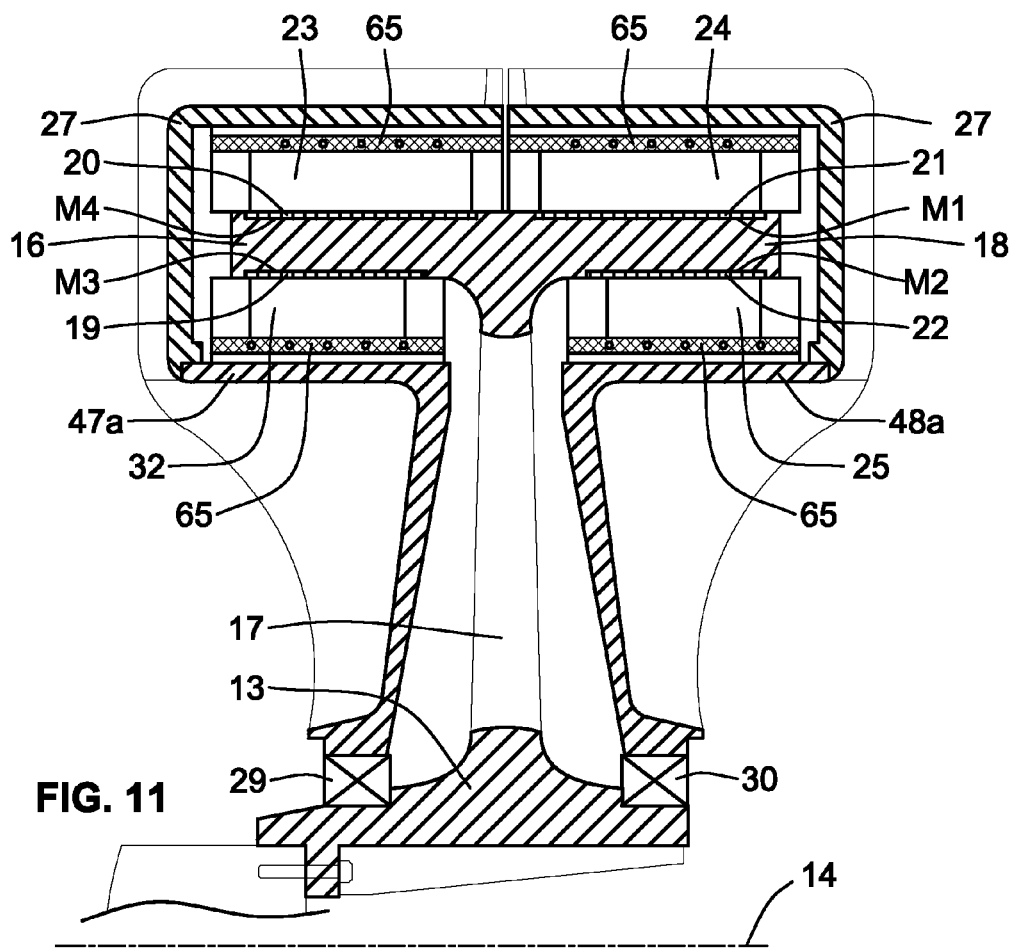
FIG. 11 is a partial cross section of an embodiment of the generator of FIG. 3.

FIG. 11 illustrates a cross section of the generator 100 according to the present invention comprising the T shaped rotor structure 104 with outer rings 16 and 18, the center spoke 17, the rotor hub 13 and left hand internal surface M3 with right hand internal surface M2, are offering a mounting surface respectively for magnets 19 and 22 as part of the generator 100 internal rotor 104 assembly (left hand and right hand) and how rotor left hand external surfaces M4 and M1 are offering a mounting surface for magnets 20 and 21 respectively, as part of the generator external rotor 104 assembly (left hand and right hand).

The rotor 104 flywheel shaped structure, is designed to be directly coupled to the wind turbine main shaft 15 rear end. Mounted directly in front of each magnet surface (separated only from a small air gap AG) there are the corresponding stator rings 32, 23, 24, 25. Each stator ring (or segment thereof) is preassembled to a stator base 65 and 46 which may include suitable cooling means and offers mounting means to connect the generator rings to the outer shell stator structure 27, and 28. FIG. 11 also illustrates how hub 13 is connected to shells 27 and 28 by means of two bearing 29 and 30, making possible the mechanical connection of shells 27, 28 to hub 13, leaving it free to spin around centerline 14. FIG. 11 also shows how left hand shell 27 can be split in two elements inner 47a and outer 47b and how right hand shell 28 can be split in inner shell 48a and outer shell 48b.

Figure 12:
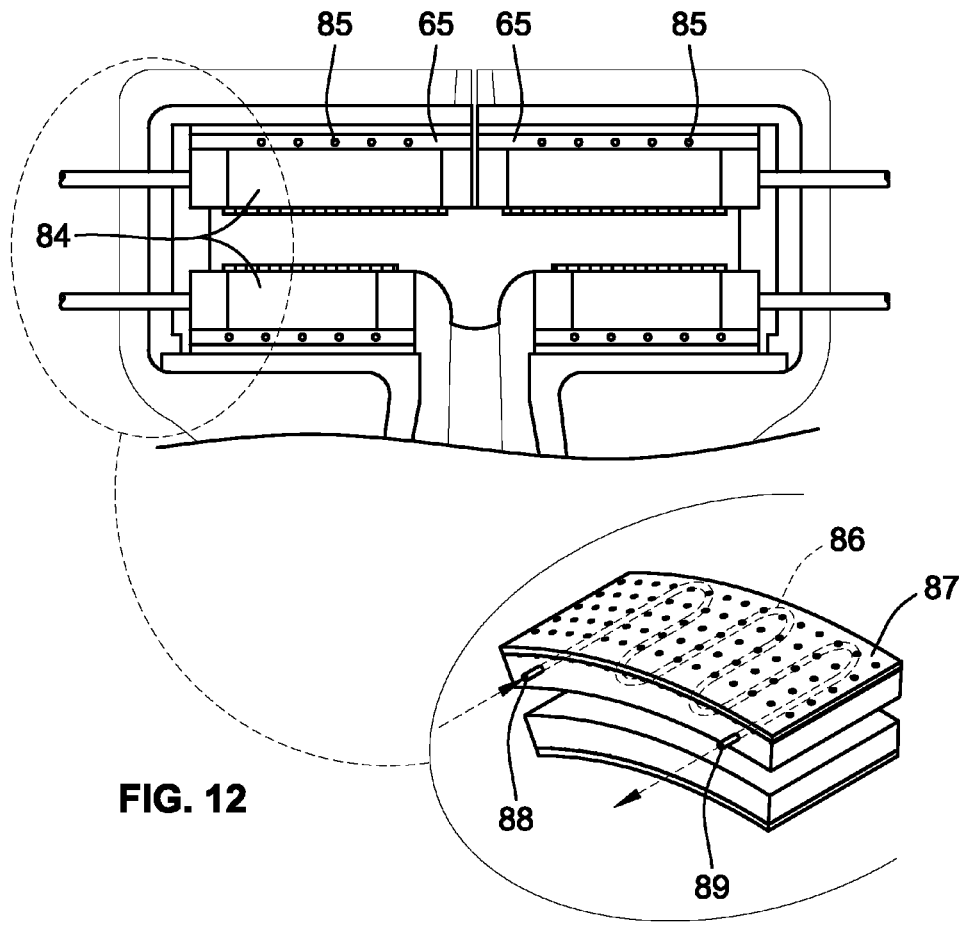
FIG. 12 is a partial cross section and a partial perspective view of a cooling system of the stator elements of the generator of FIG. 3.

FIG. 12 shows the cooling system adopted for the generator 100 wherein each stator segment 84 (See also stator segments 61, 62, 63, 64 of FIG. 10) features a stainless steel tube 85 disposed as serpentine 86 and embedded inside the stator rear base plate 65 which in this case is usually a casting. Inside the steel tube 85 a suitable flow of cooling liquid is pumped to secure proper heat evacuation and a very constant stator temperature distribution. Inlet 88 and outlet 89 of the tube 85 are brought outside and connected to a central cooling unit.

An alternative embodiment of the cooling system for the stator rings 32, 23, 24, 25 of the generator 100 may include a copper tube 90 that is press-fitted inside a groove 91 created inside the stator base plate 65. The groove 91 is arranged as a large diameter spiral that traverses the circumference of the entire stator ring 32, 23, 24, 25 bringing tube 90 to contact the back portion of each stator baseplate 65 and remove the heat that each stator segment 94 generates. In such case a monotube circuit will be provided for each stator ring which will be common to all stator segments. Tube 90 is originally a round shape and becomes partially flat after the press-fitting inside the groove 91 by means of proper tooling. In particular, the flat surface of tube 90, once deformed and press fitted inside groove 91, will be in contact with a back surface of each stator winding 66, and remove heat generated.

Figure 13:
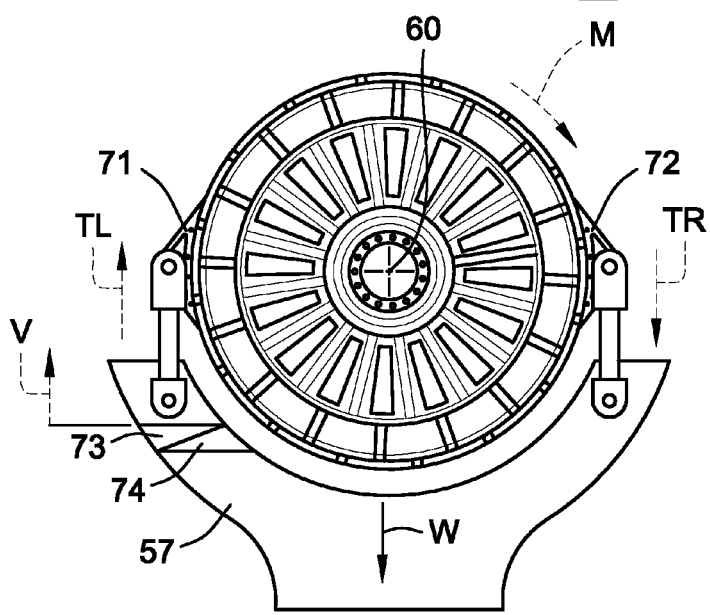
FIG. 13 is a front view of how the generator is connected to a turbine main frame by means of a torque arm arrangement.

FIG. 13 is showing a different embodiment of the counter torque of FIG. 9 featuring a dual arm arrangement wherein arm 71, and arm 72 are basically mounted in opposite directions. Arm 71 will exchange with frame 57 a reaction force TL while arm 72 will exchange with frame 57 a reaction force TR. The main advantage of this arrangement, versus the arrangement described in FIG. 9 is that TL and TR are half the value of T1 of FIG. 9, and they are in opposite direction one to another. In such case, bearings 29 and 30 in FIG. 7 and FIG. 10 will not see radial load induced by a single counter torque arm as a result of torque M.

FIG. 13 also shows how a leveling system, for example comprising two interacting wedges 73 and 74 can easily create a vertical adjust V, thus providing a simple means to compensate the weight W of the generator further releasing radial load from bearings 29 and 30. The two counter torque arms will have a built in spring not shown in the picture in order to let the generator assembly be free to float with deformation R.

Figure 14:
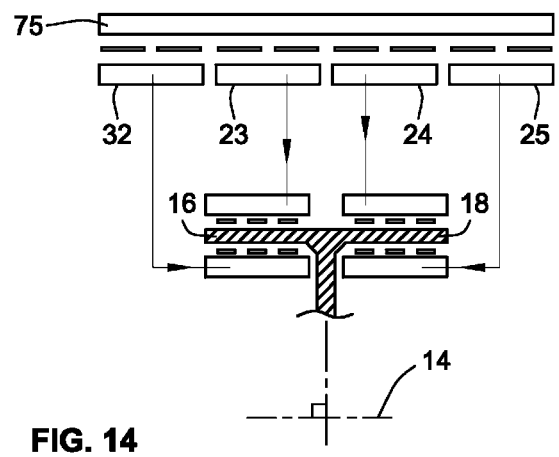
FIG. 14 is a schematic representation of how a conventional stator becomes a quadruple stator arrangement, according to the teachings of the present invention.

FIG. 14 schematically illustrates how a conventionally single piece stator becomes the four separate stator rings 32, 23, 24, 25 wrapped around the rotor rings 18 and 19 of the T shaped/fly wheel rotor 104 to become the arrangement taught by one embodiment of the present invention.

Figure 15:
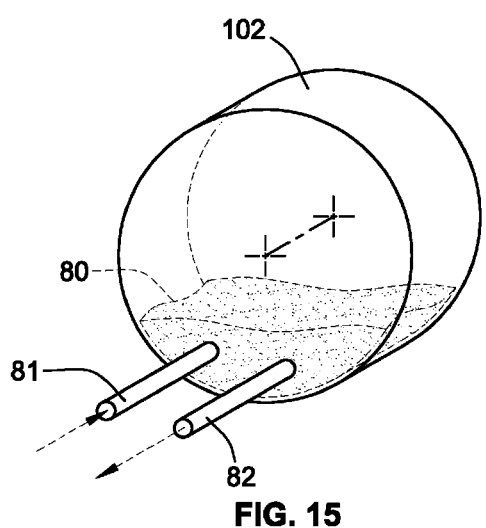
FIG. 15 is a perspective schematic view illustrating an oil based cooling system of the generator rotor.

FIG. 15 schematically shows a liquid-based cooling system for the generator rotor 104 comprising an oil volume 80 occupying the bottom portion of the generator 100 housing 102 (shells 27 and 28 combined). In particular, FIG. 15 illustrates that housing 102 can provide a built-in rotor cooling ability simply achieved by partial immersion of the rotor in said volume 80 usually filled with dielectric oil. This is essentially a so-called "oil splash" solution which secures an exuberant, safe and uniform cooling action, and also provides for bearing lubrication. It is important to observe that the uniformity of the temperature of rotor is fundamental to control the machine reduced air-gap and prevents mechanical stress to the rotor magnets. Shells 27 and 28 can also provide an oil inlet 81 and an oil outlet 82 connected to an external oil cooling device (not shown). Further, each of shells 27, 28 include fins on an exterior thereof (See FIG. 3) to promote air cooling of the overall generator assembly as well.

Figure 16:
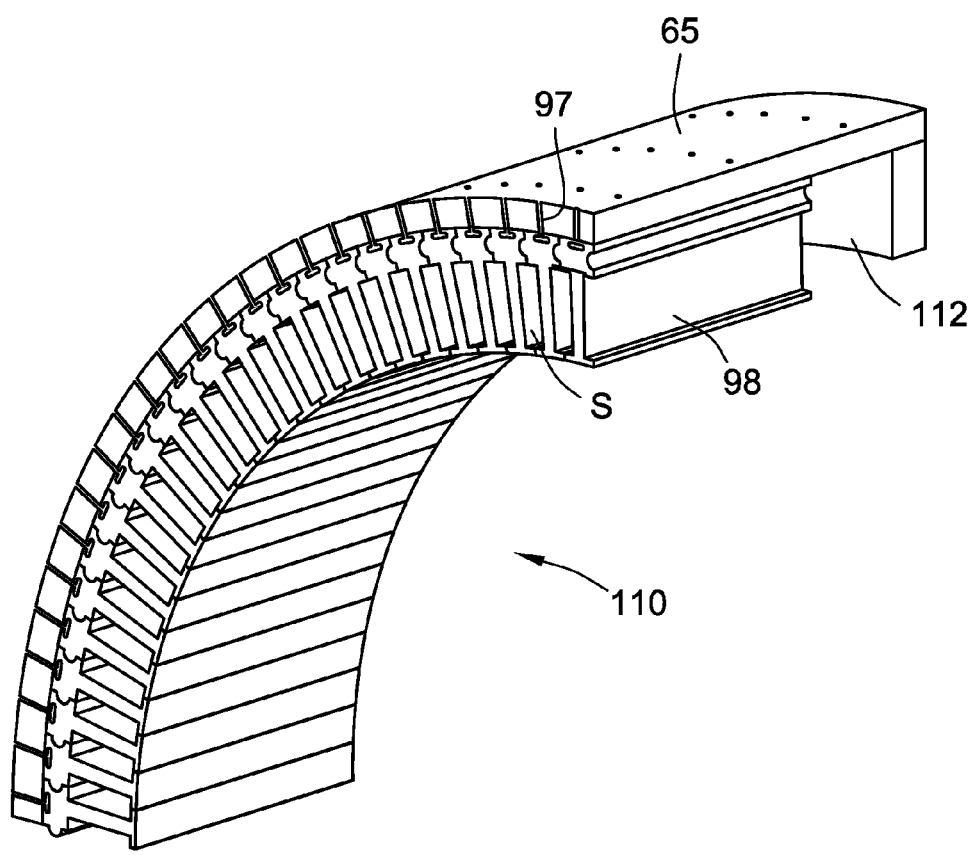
FIG. 16 is a perspective cross section of a stator segment according to an embodiment of the invention.

FIG. 16 shows a tridimensional view of an exemplary stator segment for the generator according to the present invention. As mentioned before, it comprises an archaized segment stator base plate 65 presenting a plurality of screws 97 devoted to clamping and holding in position all the stator segment poles 98 which are designed to be interlocked between each other and individually clamped to the base plate 65. Each pole 98 houses a pole winding cavity slot "S" and all poles are electrically interconnected one to another (not shown). Each stator segment has all the electric connections protected by a special resin 99 (not shown) that encapsulates the segment leaving only the output electric copper bars of each pole 98 accessible for inspection. Base plate 65 also provides a plurality of tapped holes for mounting each segment to housing 102. FIG. 16 also shows two radial stiffeners 112 temporarily bolted to plate 65 to increase the assembly rigidity during handling and transportation.

Figure 17:
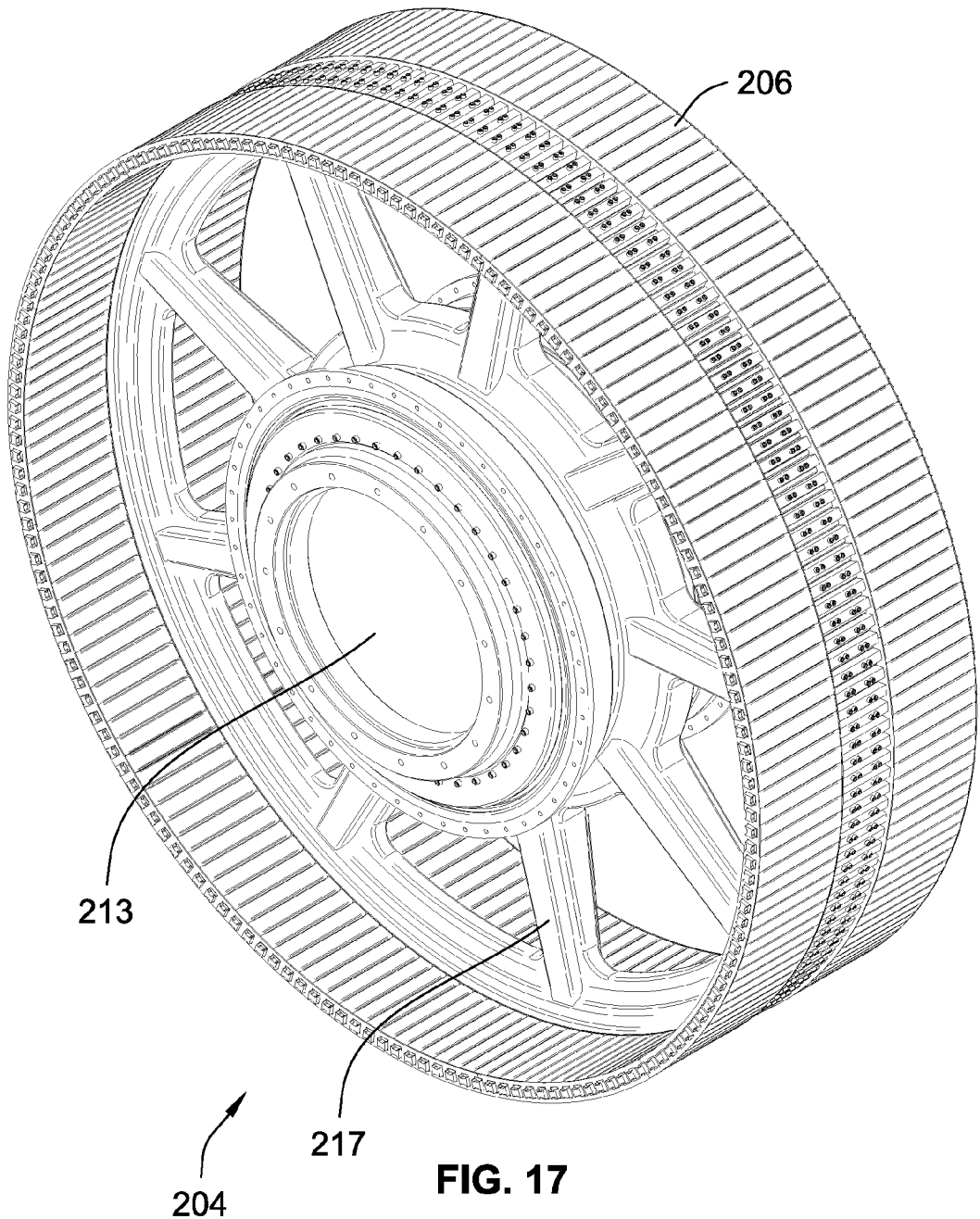
FIG. 17 is a perspective view of an alternative embodiment of a rotor assembly according to the teachings of the present invention.

Turning now to FIG. 17, an alternative embodiment of a rotor 204 is illustrated. Unlike the embodiment above which utilized a T-shaped cross section and magnet rings 19, 20, 21, 22 (See FIG. 3), this embodiment employs a rotor having a general wheel shape with a hub 213 and spoke 217 configuration, with a plurality of regularly spaced, radially outwardly opening grooves 214 (See FIG. 18) formed on an outer periphery of rotor 204. Each groove carries a magnetic dipole assembly 206, herein referred to as a "dipole rod" that has a longitudinal axis running generally parallel with a center axis of rotor 204. This rotor 204 may be employed with the generator 100 described above, in place of rotor 104. Indeed, rotor 204 may be directly coupled to a turbine main shaft and still allow for mechanical bearing connection between rotor 204 and stator housing 102 as described above so that all elements of generator 100 will follow turbine main shaft deflections/displacements to maintain a generally constant and minimal air gap between adjacent stator rings 32, 23, 24, 25.

Figure 18:
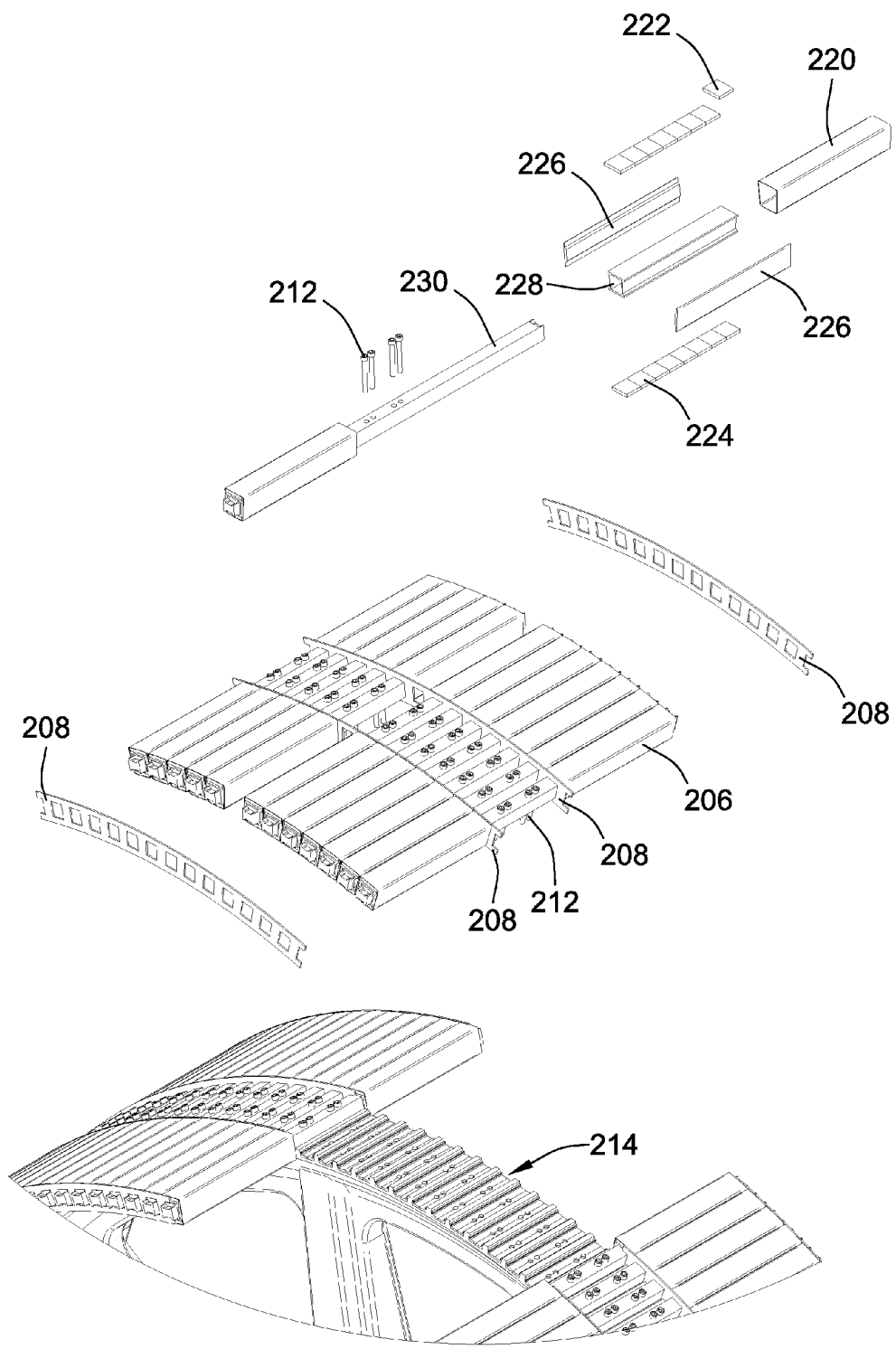
FIG. 18 is a perspective exploded view of the rotor assembly of FIG. 17.

Referring to FIG. 18, dipole rods 206 are arranged in a side-by-side parallel fashion and extend around the entire circumference of rotor 204. Each dipole rod 206 includes mounting bolts 212 for mounting it into its respective slot 214 of rotor 204. The outer most extremities of each dipole rod 206 may be connected together using support rings 208. Support rings 208 may be continuous and extend the circumference of rotor 204, or may be in sections as illustrated. Each dipole rod 206 includes magnet assemblies formed at opposing ends of the dipole rod 206. For purposes of brevity, only one magnet assembly is described in the following.

The magnet assembly includes an outer covering 220 which may be formed of carbon fiber, or any other suitable material. Beneath the outer covering 220, are first and second pluralities of magnets 222, 224 situated on opposing sides of a plurality of side-by-side steel laminations 228 which may be formed from sheet steel in a stamping process. These laminations are illustrated in an assembled state in FIG. 18, given their relatively dimensionally thin characteristics.

Each magnet of the first and second pluralities of magnets 222, 224 is generally block shaped. The first plurality of magnets 222 is supported at an underside thereof by steel laminations 228. Likewise, the second plurality of magnets 224 is also supported by the steel laminations 228 as illustrated. The side edges of the steel laminations 228 and first and second pluralities of magnets 222, 224 are supported by side supports 226.

Figure 19:
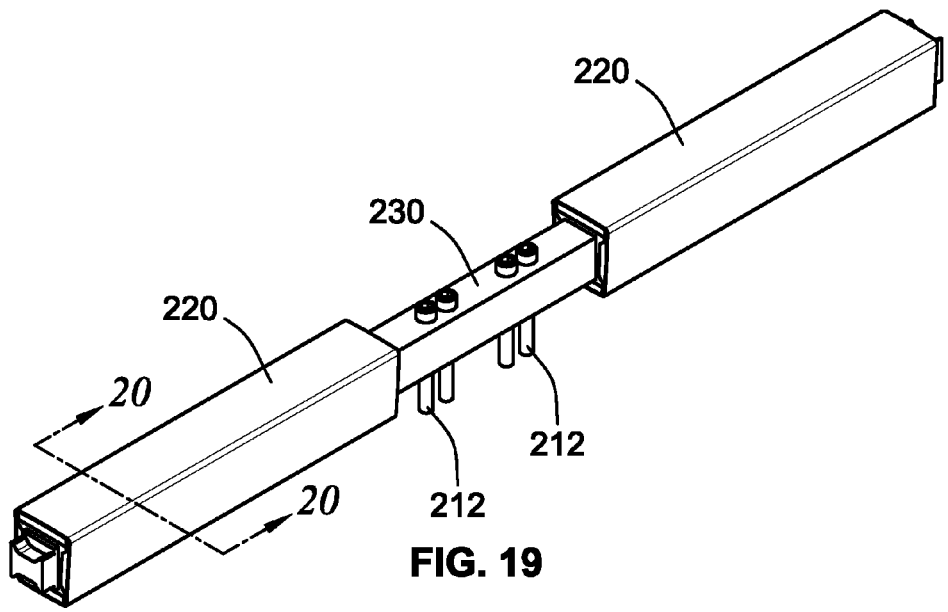
FIG. 19 is a perspective view of an exemplary magnet element of the rotor assembly of FIG. 17.

With reference to FIG. 19, a steel core 230 runs the length of each dipole rod 206 and extends through each magnet assembly as illustrated. Each dipole rod 206, extends the full length of each stator side by side stator ring 32, 23, 24, 25 (See e.g. FIG. 6).

Figure 20:
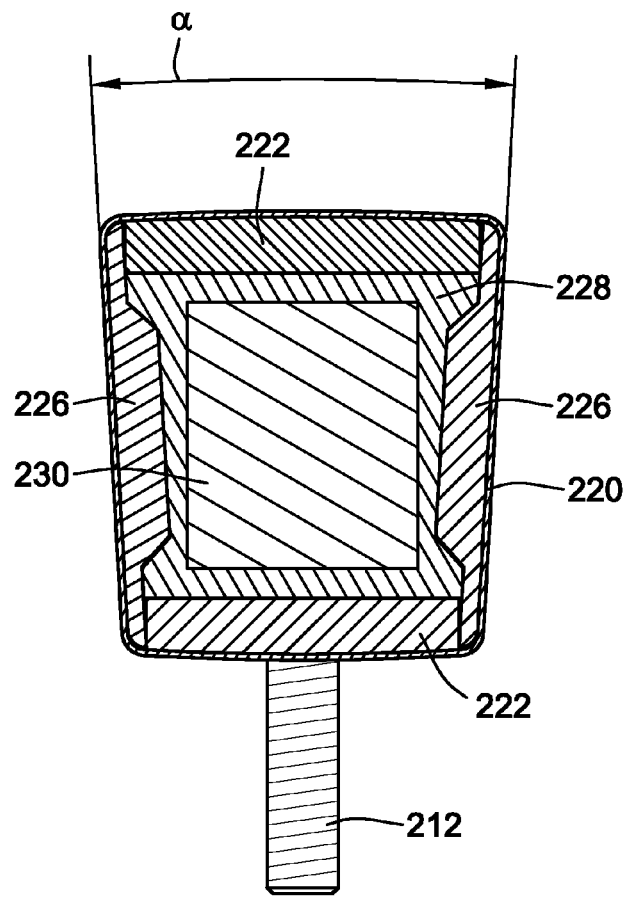
FIG. 20 is a cross section of the magnet assembly of FIG. 19.

Turning now to FIG. 20, a cross section of one magnet assembly of dipole rod 206 is illustrated. Because the cores 230 of the dipole rods present individual separated bars located one next to another, the magnetic flux lines are forced to fully pass through both radial air gaps as the cores are separated (the arrangement prevents the magnetic field flux lines from coming to close without completely passing through said double axial air gap). An additional advantage is that the magnetic dipole exchanges with the stator substantially lower electro-magnetic, interacting forces thus requiring a less massive mechanical structure versus conventional arrangements.

Although the core is described as made from steel above, it may also be manufactured from other materials, e.g. a somaloy material, aluminum, iron, etc. While each magnet assembly includes a carbon fiber sleeve 220, rotor 204 may additionally include an outer sleeve which extends around the circumference of rotor 204 for additional protection and rigidity. Each magnet assembly of each dipole rod 206 has a generally wedge shaped cross section, as denoted by angle $\alpha$.

It appears clear how, thanks to the mechanical arrangement of the components the entire generator (rotor and stators together) is free to follow any shaft deflection, without offering any mechanical reaction force, because the entire generator assembles will simply be free to float in space being unconstrained. (torque arm will only oppose rotation and will not oppose to deformation R and A). Additionally due to the mechanical strength of the rotor fly wheel as well as stator shells, the air gap between rotor and stator can be set to a value never attempted before thus achieving generator minimum cost and weight and maximum efficiency. Furthermore the original arrangements of rotor and stator allows the generator to operate with dynamic electromagnetic loads (forces exchanged between rotor magnets stator winding) perfectly balanced in both axial as well as radial direction, thus further lowering the infrastructure rigidity requirements. It is consequentially evident how this innovative generator can be designed with an air gap substantially lower than conventional direct drive generators with all the advantages previously sighted.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A generator for a wind turbine, comprising:
    a housing defining a center axis;
    a stator arrangement mounted to interior surfaces of the housing and centered about the center axis;
    a rotor assembly configured for direct attachment to a wind turbine main shaft such that rotation of the wind turbine main shaft results in a like rotation of the rotor assembly, the rotor assembly having radially inward and radially outward directed faces, the radially inward and radially outward directed faces each facing a portion of the stator arrangement; and
    wherein the housing is mechanically coupled to the rotor assembly such that the rotor assembly is free to rotate relative to the housing and such that displacement of the rotor assembly from the center axis of the housing results in a like displacement of the stator arrangement and the housing.

2. The generator of claim 1, wherein the housing is a multi-piece housing including at least two shell halves which mate about a plane perpendicular to the center axis.

3. The generator of claim 2, wherein each shell half includes an outer ring and a core, the outer ring attached to the core to define cavity within the housing having a generally T-shaped cross section on one side of the center axis of the housing.

4. The generator of claim 1, wherein the stator arrangement is a multi-piece stator arrangement comprising at least three concentric rings.

5. The generator of claim 4, wherein the at least three concentric rings includes a first, a second, and a third stator ring, the first and second stator rings radially inward of the radially inward directed face of the rotor assembly, the third stator ring radially outward of the radially outward directed face of the rotor assembly.

6. The generator of claim 4, wherein the at least three concentric rings includes a first, a second, a third, and a fourth stator ring, the first and second stator rings radially inward of the radially inward directed face of the rotor assembly, the third and fourth stator rings radially outward of the radially outward directed face of the rotor assembly.

7. The generator of claim 4, wherein each one of the at least three concentric rings comprises a plurality of independent arcuate stator segments.

8. The generator of claim 7, wherein each stator segment includes a cooling means for directing coolant through the stator segment.

9. The generator of claim 1, wherein the rotor assembly comprises a rotor structure having a generally T-shaped cross section on one side of the center axis and a plurality of ring shaped magnet structures attached to the rotor structure.

10. The generator of claim 9, wherein the plurality of ring shaped magnet structures includes a first, a second, a third, and a fourth magnetic ring structure, the first and second magnetic ring structures mounted to the radially inward directed faces of the rotor assembly, the third and fourth magnetic ring structures mounted to the radially outward directed faces of the rotor assembly.

11. The generator of claim 10, wherein the first, second, third, and fourth magnetic ring structures are each concentrically arranged about the center axis of the housing.

12. The generator of claim 11, wherein the first and second magnetic ring structures are radially equidistant from the center axis of the housing, and wherein the third and fourth magnetic ring structures are radially equidistant from the center axis of the housing.

13. The generator of claim 1, wherein the rotor assembly comprises a rotor structure having a plurality of regularly spaced, radially outwardly directed grooves and comprises a plurality of bar shaped magnet structures, with each one of the plurality of bar shaped magnet structures respectively mounted in each one of the radially outwardly directed grooves.

14. The generator of claim 13, wherein the plurality of bar shaped magnet structures are arranged parallel to one another, and parallel to a center axis of the housing.

15. The generator of claim 14, each one of the plurality of bar shaped magnet structures includes a core having a first and a second end, and wherein a first magnet assembly is mounted adjacent the first end of the core, and a second magnet assembly is mounted adjacent the second end of the core.

16. A generator for a wind turbine, comprising:
    a housing defining a center axis and having a cavity;
    a stator arrangement mounted to the housing within the cavity and concentrically arranged about the center axis of the housing;
    a rotor assembly concentrically arranged about the center axis, the rotor assembly including a rotor frame structure with a plurality of magnet structures arranged on an outer periphery of the rotor frame structure parallel to one another, wherein each one of the plurality of magnet structures has a radially inwardly and a radially outwardly directed face, with each of the radially inwardly and radially outwardly directed faces facing a portion of the stator arrangement;
    wherein the housing is mechanically coupled to the rotor assembly such that the rotor assembly is free to rotate relative to the housing and such that displacement of the rotor from the center axis of the housing results in a like displacement of the stator arrangement and the housing.

17. The generator of claim 16, wherein each one of the plurality of magnet structures is bar shaped and comprises:
    a core extending longitudinally between first and second ends;
    a first magnet assembly positioned on the core adjacent the first end;
    a second magnet assembly positioned on the core adjacent the second end; and
    wherein the first and second magnet assemblies are axially spaced apart from one another along the core.

18. The generator of claim 17, wherein each of the first and second magnet assemblies includes a first and a second plurality of magnets, the first and second pluralities of magnets arranged in a radially opposed spaced relationship, and wherein a plurality of identical laminations are arranged along the core and support each of the first and second pluralities of magnets.

19. The generator of claim 17, wherein the first magnet assembly of each one of the plurality of bar shaped magnet structures is radially interposed between first and second concentric stator rings of the stator arrangement, and wherein the second magnet assembly of each one of the plurality of bar shaped magnet structures is radially interposed between third and fourth concentric stator rings of the stator arrangement.

20. A wind turbine, comprising:
a support frame;
a turbine main shaft arranged along a center axis of the wind turbine;
a generator comprising a stator arrangement and a rotor assembly which is directly coupled to the turbine main shaft such that rotation of the turbine main shaft results in a like rotation of the rotor assembly, the stator arrangement and rotor assembly internally disposed within a housing of the generator; and
a torque arm arrangement connected between the support frame and the housing, the torque arm arrangement adapted to resist a rotation of the housing in response to a rotation of the rotor assembly relative to the housing and adapted to allow for displacement of the generator relative to the center axis of the wind turbine.

21. The wind turbine of claim 20, further comprising a coolant bath arranged within the housing such that it encompasses a portion of the rotor assembly as the rotor assembly rotates commensurate with the rotation of the turbine main shaft.

22. The wind turbine of claim 20, wherein the rotor assembly of the generator comprises a rotor frame structure with a plurality of magnet structures arranged on an outer periphery of the rotor frame structure parallel to one another, wherein each one of the plurality of magnet structures has a radially inwardly and a radially outwardly directed face, with each of the radially inwardly and radially outwardly directed faces facing a portion of the stator arrangement.

23. The wind turbine of claim 20, the housing is mechanically coupled to the rotor assembly such that the rotor assembly is free to rotate relative to the housing and such that displacement of the rotor from the center axis results in a like displacement of the stator arrangement.

24. The wind turbine of claim 20, wherein the stator arrangement is disposed radially interior and radially exterior of the rotor assembly.

* * * * *